United States Patent [19]

Jones

[11] 3,893,176

[45] July 1, 1975

[54] MEANS AND METHOD OF TAPE GUIDE CONTROL WITH TAPE SKEW AND LATERAL DISPLACEMENT CORRECTIONS IN A ROTARY HEAD DRUM

[75] Inventor: David Wilkes Jones, San Jose, Calif.

[73] Assignee: International Business Machines Corporation, Armonk, N.Y.

[22] Filed: June 12, 1974

[21] Appl. No.: 478,571

[52] U.S. Cl. ........................ 360/70; 360/71; 360/84

[51] Int. Cl. ............................................. H04n 5/78

[58] Field of Search .................... 360/69, 70, 71, 84

[56] References Cited

UNITED STATES PATENTS

| | | | |
|---|---|---|---|
| 3,541,272 | 11/1970 | Nassimene | 360/70 |
| 3,623,042 | 11/1971 | Woehier | 360/71 |

OTHER PUBLICATIONS

IBM Tech. Disc. Bulletin (I), Vol. 15, No. 9, 2/73, p. 2,743.

IBM Tech. Disc. Bulletin (II), Vol. 15, No. 9, 2/73, pp. 2,744–2,745.

*Primary Examiner*—Raymond F. Cardillo, Jr.
*Attorney, Agent, or Firm*—Nathan N. Kallman

[57] ABSTRACT

A rotary head helical tape drive includes a split mandrel with a rotary head drum between the mandrel sections. Separate air chambers formed with the mandrel structure are provided, to which controlled air pressures are applied during transport of the tape. To adjust for skew angle and lateral displacement of the tape during operation of the apparatus, the pressures are varied at the air chambers, thereby changing the angle or shifting the position of the tape relative to the rotary head drum.

7 Claims, 4 Drawing Figures

MEANS AND METHOD OF TAPE GUIDE CONTROL WITH TAPE SKEW AND LATERAL DISPLACEMENT CORRECTIONS IN A ROTARY HEAD DRUM

BACKGROUND OF THE INVENTION

1. Field of the Invention

This invention relates to an improved means and method of controlling tape position and angle relative to a magnetic head.

2. Description of the Prior Art

In rotary head tape recorders, the magnetic tape is guided helically, and transverse or oblique tracks are thereby registered and scanned across the tape. This type of recorder is subject to peculiar guidance problems, such as tape skew and lateral displacement of the tape. When these conditions occur, the rotary head may be out of tracking position or misaligned with respect to the obliquely or transversely recorded data tracks, and therefore the head may not accurately follow the data tracks across the tape. In such case, the signal that is being read out will suffer from low amplitude, or distortion caused by crosstalk from the adjacent data tracks. These undesirable results become more severe as track density is increased.

To overcome problems associated with precise track following and proper positioning of the head relative to the data tracks, servosystems are commonly employed. In systems of this type, servo signals are prerecorded on the tape and error signals are developed which may be used to speed or slow the tape, or to shift the tape laterally, so that the desired alignment between the head and the data tracks is realized.

Also, in tape apparatus wherein the magnetic tape is transported from one reel to another, guide posts are generally used to maintain the tape in a defined path. Guide posts add to the expense of construction and maintenance and introduce friction and wear to the moving tape. It would be advantageous to have a tape drive in which a guidance control system acts to achieve both lateral alignment and skew correction without the need for guide posts or other elaborate guide mechanisms.

It has been found that mechanical and electromechanical components used for tape guiding and repositioning require a high degree of precision with small tolerances, in order to achieve proper correction in high data density systems. The manufacturing processes and wear during operation of the tape drive are limiting factors in realizing the necessary degree of precision. It would be desirable to employ a means and method that eliminates as much of the frictional mechanical elements as possible, and yet which provides correction and alignment for tape displacement and skewing angle that is linear and accurate and yet inexpensive.

Although the embodiment disclosed herein is illustrated as a rotary head helical tape drive, it should be understood that the scope of the invention is not limited thereto and may be applicable to other tape system configurations.

SUMMARY OF THE INVENTION

An object of this invention is to provide a tape drive in which automatic corrections for lateral displacement and skew angle are achieved in a simple and inexpensive manner.

Another object of the invention is to provide a tape guidance system that does not require external steering apparatus.

Another object is to provide a tape drive wherein frictional effects that occur from mechanical guide elements are substantially reduced.

In accordance with one embodiment of this invention, a rotary head helical tape drive employs a pressurized porous cylindrical mandrel structure around which a magnetic tape is wrapped for at least 270° of the mandrel circumference. The mandrel structure is split so that a rotary head drum may be located between the mandrel portions for recording and reading oblique or transverse tracks registered across the tape. A split air chamber that straddles the rotary head at one circumferential location of the mandrel structure coacts with one section of the tape, and the air flow is controlled to achieve lateral displacement of the tape; whereas two spaced steering modules employing differential air pressure at a second circumferential location of the mandrel structure coact with two sections of the tape and serve to correct for tape skew.

BRIEF DESCRIPTION OF THE DRAWING

The invention will be described in greater detail with reference to the drawing in which.

Similar numerals refer to similar elements throughout the drawing.

DESCRIPTION OF THE PREFERRED EMBODIMENT

Figure 1:
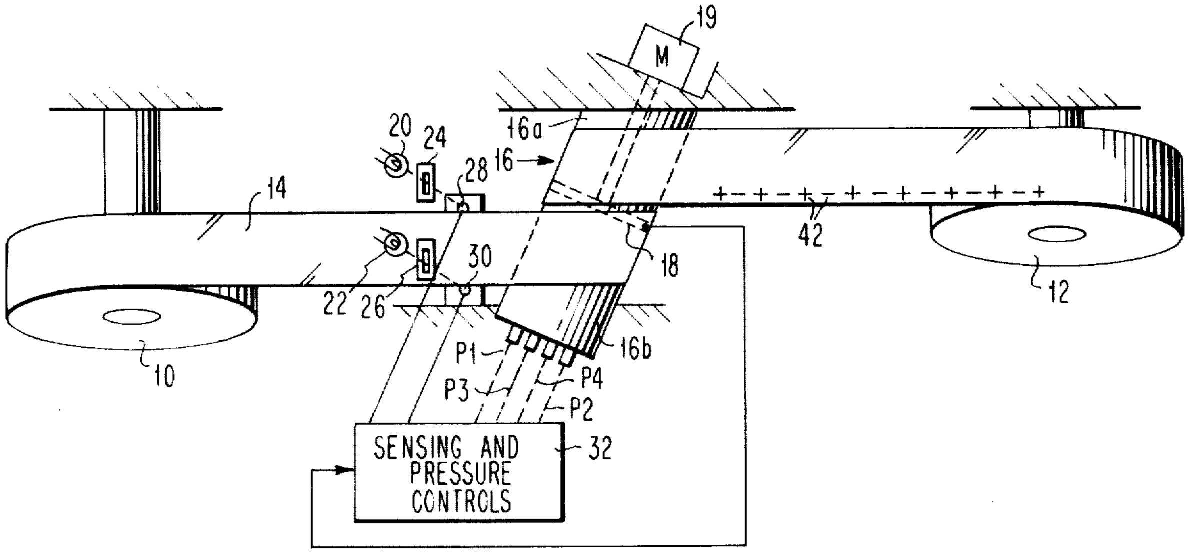
FIG. 1 is a schematic top view of a rotary head helical tape drive, such as used with the present invention.

With reference to FIG. 1, one embodiment of a rotary head helical tape drive made in accordance with this invention is shown, which includes supply and take-up reels 10 and 12 respectively, between which a magnetic tape 14 is transported. The reels may be driven by separate motors, or a single motor and capstan (not shown) in a well-known manner. The tape is wound about a cylindrical mandrel structure 16, split into two sections 16*a* and 16*b*, with a gap therebetween. In the mandrel gap, a rotary magnetic head drum 18 driven by a motor 19 is disposed, which supports one or more magnetic transducers at its periphery for transducing relation with the magnetic tape. The mandrel 16 is porous, and pressurized air that is introduced internally to the mandrel cylinder flows out and generates an air film at the mandrel surface. The air film effectively acts as an air bearing to float the magnetic tape relative to the magnetic head.

In tape systems of this type, particularly those which process high track density data, the rotary head must trace a path that precisely follows that of each recorded data track. If a deviation in position or skewing occurs between the rotary head and the tape, the magnetic head may pick up crosstalk or spurious signal from an adjacent track, such that the readout signal is distorted or of low amplitude. To correct for skew, servo tracks that are prerecorded on the tape may be used to develop an error signal, which is then used to vary the speed of the motor or capstan that drives the tape to adjust its position relative to the head.

In accordance with this invention, steering modules or air chambers formed with the cylindrical mandrel structure are used concurrently for skew angle control and for lateral track-to-track error control.

The linear alignment or skew angle of the tape is sensed by a photosensing apparatus comprising light sources 20 and 22 that direct radiation through narrow slits 24 and 26 respectively to photodiodes 28 and 30. The photodiodes are positioned so that they bound the edges of the tape and define a line orthogonally to the longitudinal direction of the moving tape that is approaching the head area.

Figure 2:
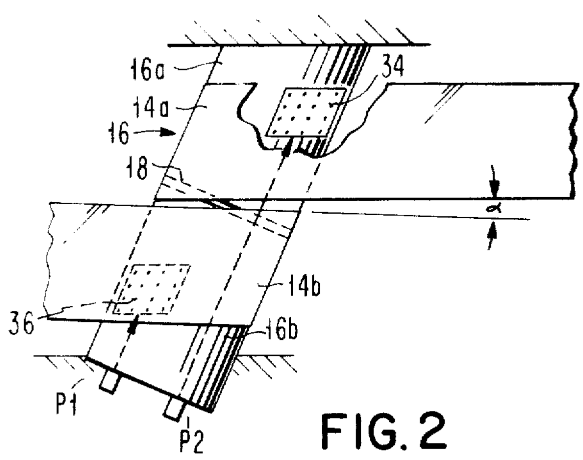
FIG. 2 is a schematic top view of a portion of the tape drive of FIG. 1, illustrating one aspect of the invention.

As long as the opaque tape is aligned properly, the photodiodes 28 and 30 both receive substantially the same amount of radiation from the light sources 20 and 22. Consequently, a zero skew error signal is developed in the control curcuit 32, and no correction for skew angle is needed. However, if the tape is skewed relative to the orthogonal transverse line defined by the photodiodes a skew angle $\alpha$ between the edges of the tape is shown in FIG. 2, the light to one of the diodes will be blocked by the opaque or translucent tape 14, thereby generating a skew error signal at the sensing control apparatus 32. The error signal is representative of the difference in light received at the two photodiodes, and the polarity of the error signal received provides an indication of which direction the tape is skewed. In response to the error signal, the control apparatus 32 will vary the pressures provided to air chambers 34 and 36, which receive air through inlet nozzles P1 and P2. The air chambers 34 and 36 are displaced circumferentially relative to the axis of the mandrel cylinder, and each chamber is associated with a different section of the tape.

As the pressures are varied and a differential pressure is established, the two sections **14*a* and 14*b* of the tape adjacent to the chambers 34 and 36 tend to move towards or away from each other, according to the angle of skew and displacement of the tape edges from the sensing diodes. The tape sections will them align themselves so that the tape edges run parallel to each other, as illustrated in FIG. 1. When this condition of parallelism is reached, a zero error skew signal is developed and the pressures to chambers 34 and 36** are then brought into equilibrium.

Figure 3:
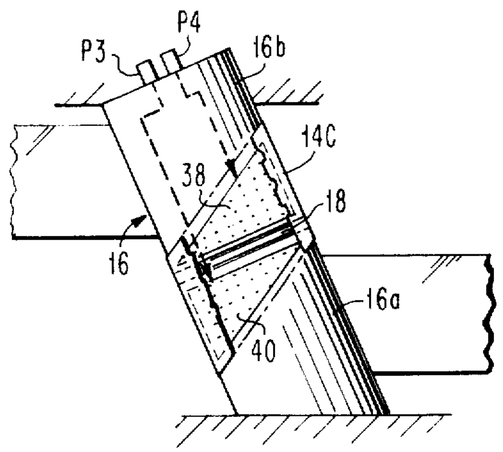
FIG. 3 is a schematic bottom view of a portion of the tape drive of FIG. 1, illustrating another aspect of the invention.
Figure 4:
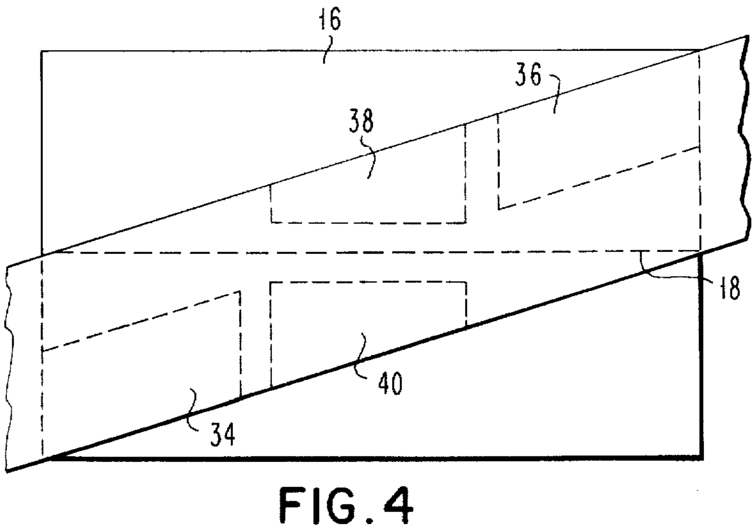
FIG. 4 is an illustrative view to aid in the explanation of the invention.

The problem of lateral displacement of the tape relative to the head is solved by the use of adjacent steering modules or air chambers 38 and 40. (See FIG. 3.) A lateral displacement of the tape will result in the rotary head being off track relative to the data tracks that are registered transversely or obliquely across the tape. If the head is not following the track precisely, a servosystem which may employ prerecorded servo signals will develop an error signal indicating this off-track condition. A servosystem of this type is disclosed in copending U.S. Pat. Application Ser. No. 254,669, filed May 18, 1972, and assigned to the same assignee. The servosystem is capable of indicating on which side of the track the head is moving, by virtue of the servo pattern 42 consisting of uniformly spaced positive and negative recorded signals associated with each of the data tracks. The head 18 reads the alternating reference servo signals and the readout servo signal is directed to the sensing and control apparatus 32 to develop an error signal. The sensing and pressure control apparatus 32 will act in response to the servo error signal by providing a differential air pressure through inlets P3 and P4 to independent air chambers 38 and 40, such that there will be a lateral displacement of the section **14*c* of the tape that is adjacent to the air chambers 38 and 40** at any given time. The displacement will align the recorded data tracks precisely with the path traced by the rotating head across the tape.

With the novel apparatus disclosed herein, the corrections for both skew angle and lateral displacement can be accomplished concurrently. No mechanical guides or precisely machined parts, such as conventionally employed, are required for tape guiding and alignment. The response of the pneumatic controls is relatively rapid, particularly in the area adjacent to the rotary head where proper position and alignment are critical. Lateral tolerance problems encountered in linear recording and helix angle distortion that occur in rotary head recording are virtually solved by the novel configuration set forth in this application.

What is claimed is:

1. An apparatus for transporting a tape relative to a magnetic head comprising:
   - a porous cylindrical mandrel structure about which a magnetic tape is transported;
   - a magnetic head positioned for transducing relation with said tape;
   - first and second spaced air chambers formed with said mandrel and positioned for providing air pressures to different sections of the tape that are engaged with said mandrel, so that skew of the tape relative to said head may be compensated;
   - third and fourth air chambers formed with said mandrel and positioned for providing air pressures to another section of said tape that is disposed between said different sections, so that lateral displacement of the tape relative to said head may be corrected; and
   - a sensing and pressure control means for developing error signals representative of tape skew and lateral displacement, and for controllably varying the pressures to said air chambers to effectively correct for such skew and displacement.

2. An apparatus as in claim 1, including photosensing means for sensing the edges of said tape and for generating a skew error signal.

3. An apparatus as in claim 1, wherein said first and second spaced air chambers are displaced circumferentially relative to the central axis of the cylindrical mandrel structure.

4. An apparatus as in claim 1, wherein said mandrel structure is split into two cylindrical sections.

5. An apparatus as in claim 4, wherein said magnetic head is a rotary head disposed between said two mandrel sections.

6. An apparatus as in claim 5, wherein said third and fourth air chambers are closely adjacent to said rotary head.

7. A method of correcting the position and alignment of a tape that is transported relative to a magnetic head comprising the steps of:
   - sensing the edges of the moving tape and generating an error signal representative of the angle of skew of said tape relative to said head;
   - providing a differential air pressure to different sections of said tape to correct for said skew error;

sensing prerecorded servo signals associated with recorded data tracks and developing a track following error signal representative of the displacement of the tape relative to the position of the magnetic head; and providing a second differential air pressure across one section of the tape adjacent to said head to correct for lateral displacement of said tape.

* * * * *